United States Patent [19]

Chuang et al.

[11] Patent Number: 4,924,948

[45] Date of Patent: May 15, 1990

[54] SHOCK ABSORBING BIT RETAINING RING

[75] Inventors: Jo-Yu Chuang, Sugar Land; Edward V. Fritsch, Palestine, both of Tex.

[73] Assignee: Sandvik Rock Tools, Inc., Bristol, Va.

[21] Appl. No.: 271,293

[22] Filed: Nov. 15, 1988

[51] Int. Cl.[5] .............................................. B23B 45/16

[52] U.S. Cl. .................................................... 173/139

[58] Field of Search ........................ 173/139, 128, 133

[56] References Cited

U.S. PATENT DOCUMENTS

| | | |
|---|---|---|
| 2,798,048 | 4/1961 | Walker . |
| 3,322,216 | 5/1967 | Kurt . |
| 3,343,606 | 9/1967 | Dollison . |
| 4,079,793 | 3/1978 | Mosely et al. . |
| 4,194,582 | 3/1980 | Ostertag . |
| 4,562,974 | 1/1986 | Bezette et al. . |
| 4,614,241 | 9/1986 | Croven ............................... 173/139 |

*Primary Examiner*—Frank T. Yost
*Assistant Examiner*—Willmon Fridie, Jr.
*Attorney, Agent, or Firm*—Burns, Doane, Swecker & Mathis

[57] ABSTRACT

A percussion tool assembly, such as a rock drill assembly, with a new and useful split retaining ring for maintaining the drill bit in the drill assembly. The split retaining ring has a Belleville spring-like profile to enable the split retaining ring to deflect resiliently when the drill bit is driven into engagement with the split retaining ring. The split retaining ring functions as a conventional retaining ring and also as a shock absorber to absorb surplus energy not completely used in the drilling of rock or other strata.

12 Claims, 5 Drawing Sheets

Fig. 1
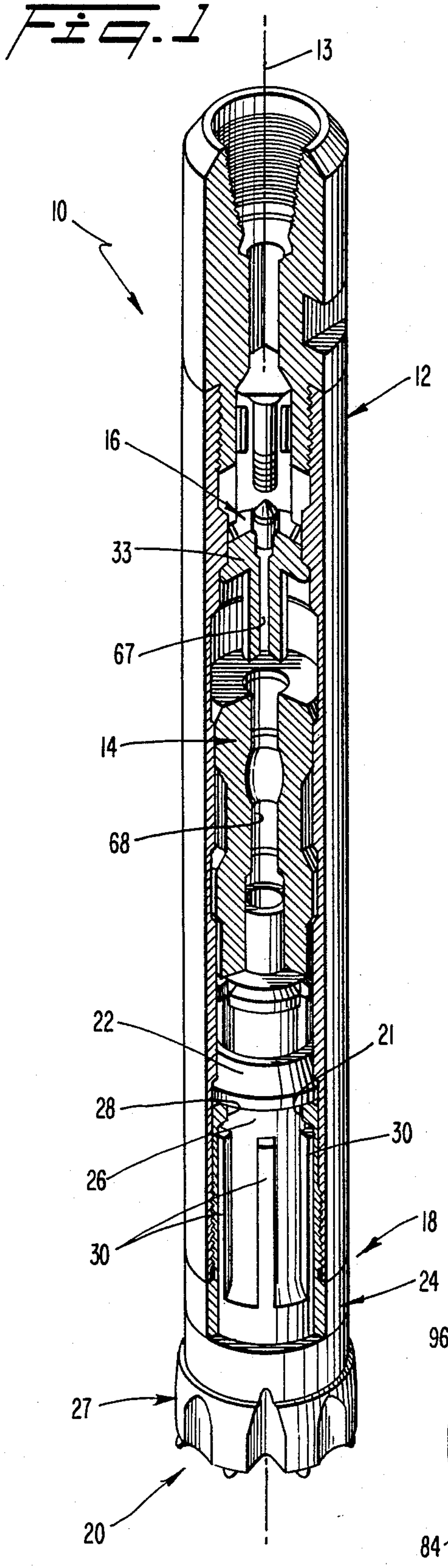
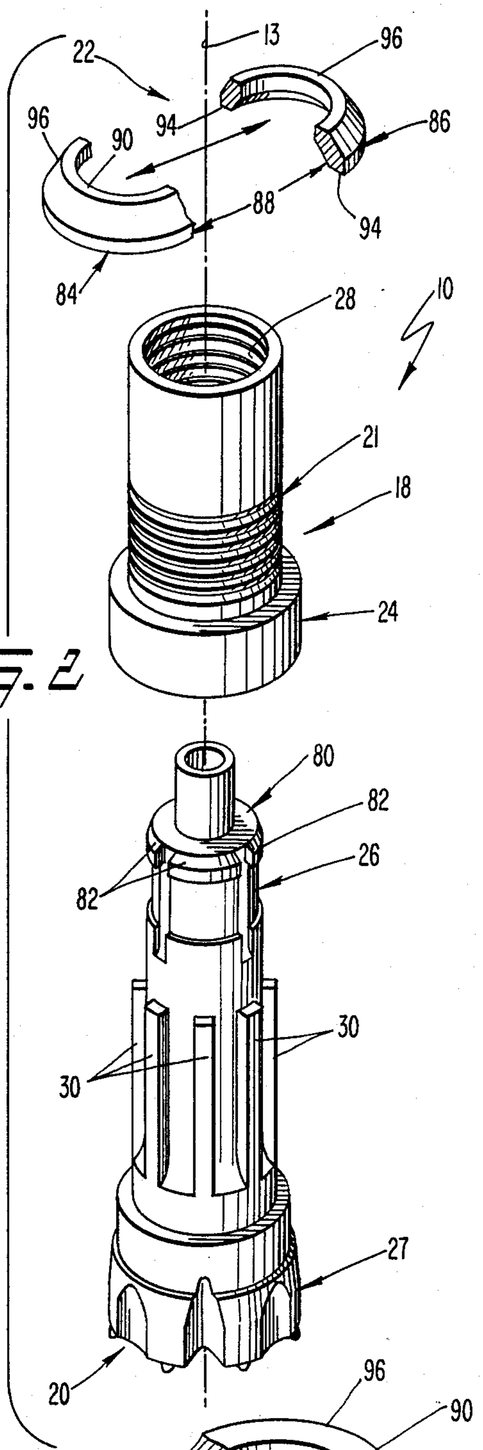
Fig. 2
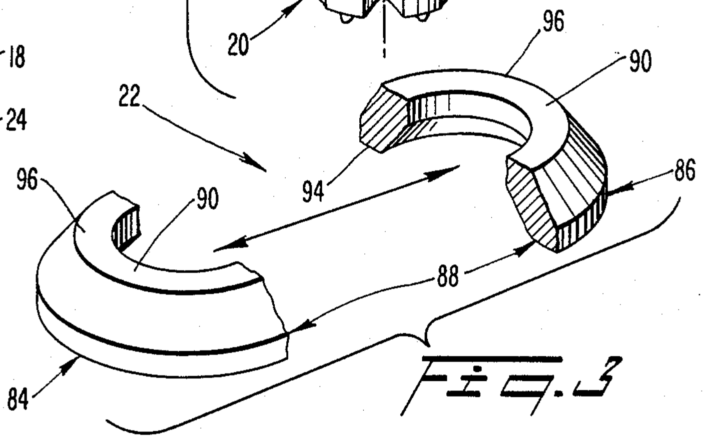
Fig. 3

Fig. 4
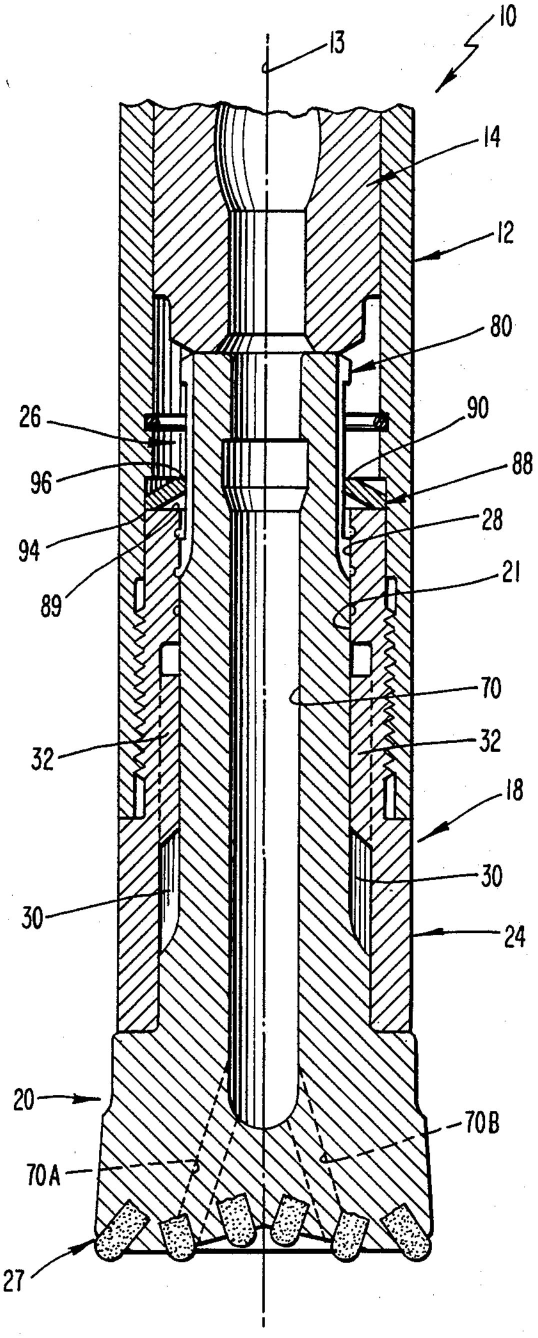
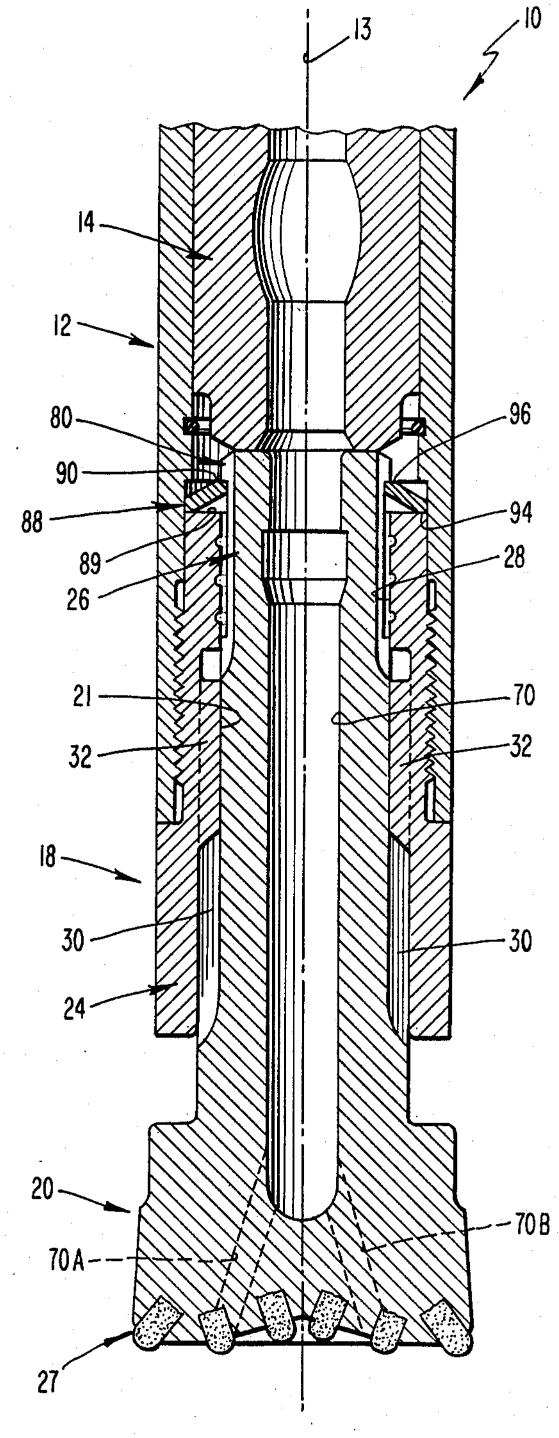
Fig. 5

FIG. 11
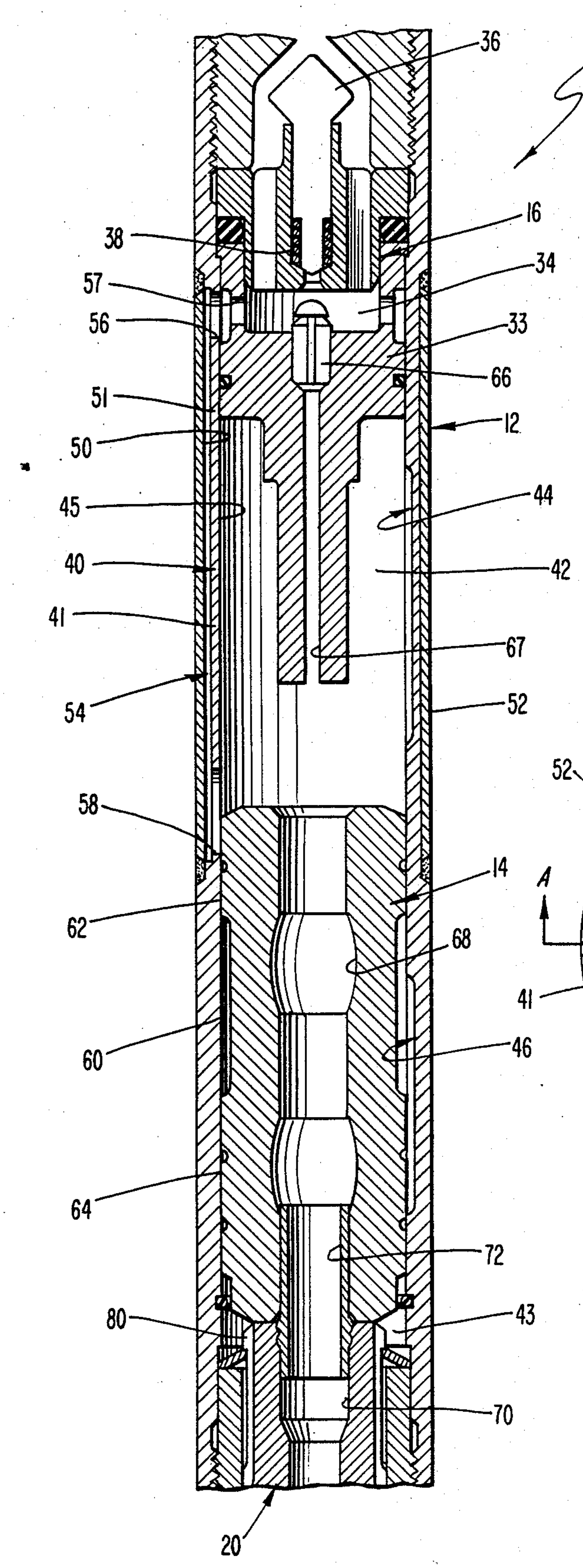
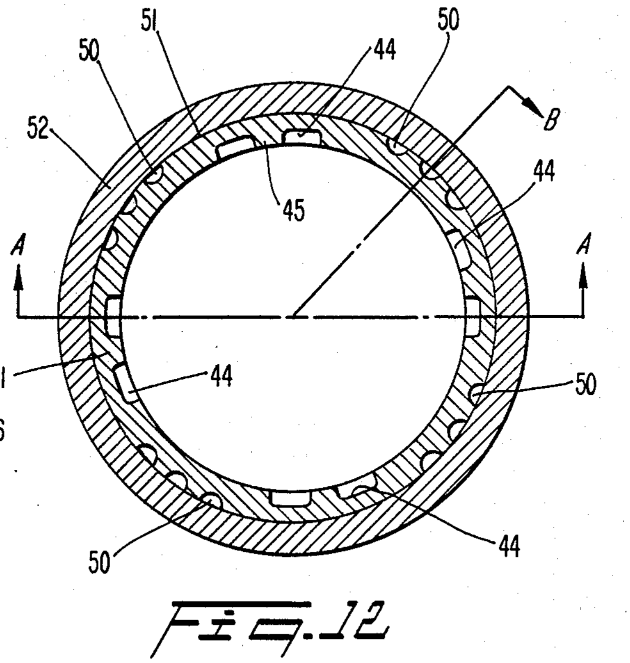
FIG. 12

SHOCK ABSORBING BIT RETAINING RING

TECHNICAL FIELD

The present invention relates to a percussion tool assembly (e.g., a rock drill assembly) with a new and useful split retaining ring. The split retaining ring (i) retains an impact member such as a drill bit in the tool assembly and (ii) deflects elastically to absorb surplus energy (e.g., energy not completely used in the drilling of rock or other strata).

BACKGROUND

A pneumatic rock drill assembly normally includes a rotary casing, a driver sub having a threaded connection with the casing, and a drill bit having a splined connection with the driver sub. The splined connection between the driver sub and the drill bit enables the drill bit to rotate with the driver sub and to move axially relative to the driver sub and the casing as the drill bit is driven into the rock or other strata being drilled. Compressed air is used to drive a piston in a reciprocating motion, and during each downstroke the piston strikes the drill bit to drive the drill bit into the rock or other strata being drilled.

A retaining ring retains (secures) the drill bit in the drill assembly. The retaining ring is disposed to engage a retaining shoulder on the drill bit when the drill bit has been driven a certain distance relative to the casing (to a position known as the "drop open" position). The retaining ring resists additional movement of the drill bit, thereby retaining the drill bit in the drill assembly.

One conventional type of retaining ring is an annular split ring with an elastomeric band about its outer periphery. The retaining ring is relatively massive and stiff and has not been designed to absorb shock. The elastomeric band facilitates assembly and alignment of the annular retaining ring in the drill casing, but has no appreciable effect on the ring's shock absorbing capabilities.

Under normal drilling conditions, the resistance of the rock being drilled takes up most of the impact forces generated during drilling. The piston drives the drill bit a short distance into the rock ahead of it, but the drill bit is normally not driven to its "drop open" position. However, if poor drilling practices are followed, or if the rock is exceptionally weak or unconsolidated, the impact of the piston can drive the drill bit to its "drop open" position. When that happens, the retaining shoulder on the drill bit impacts the retaining ring. With a retaining ring that is massive and stiff, impact forces are either reflected back to the drill bit or transmitted to the threaded connection between the driver sub and the casing. Such impact forces can cause deformation of the retaining shoulder of the drill bit and can contribute to premature fatigue failure in the threaded connection between the casing and the driver sub.

In percussion drill assemblies, the use of spring shock absorbers in addition to conventional retaining rings is known. For example, an Ingersoll-Rand percussion drill assembly uses a conventional annular split retaining ring, and an additional spring structure to absorb shocks. The additional spring structure comprises a stack of four annular Belleville springs disposed between a piston bumper and the casing. As the drill bit is driven toward its "drop open" position, the retaining shoulder of the drill bit passes through the annular Belleville springs and engages the split retaining ring in the usual manner. At the same time, the piston contacts the piston bumper, which engages the Belleville springs to absorb some measure of the impact load. The springs used in the Ingersoll-Rand drill are conventional Belleville springs (i.e., complete rings).

SUMMARY OF THE INVENTION

The present invention provides a percussion tool assembly with a specially configured split retaining ring which functions both as a shock absorber as well as a retaining ring.

The split retaining ring of the invention has a Belleville spring-like profile and is disposed to engage a retaining shoulder of an impact member when the impact member is driven to its "drop open" position. When engaged by the impact member, the split retaining ring functions as a conventional retaining ring to retain the impact member in the tool assembly. Moreover, the Belleville spring-like profile of the retaining ring enables the retaining ring to deflect elastically to absorb surplus impact energy.

Unlike conventional annular Belleville springs, the retaining ring of this invention is split. Moreover, unlike conventional split retaining rings, the split retaining ring of the present invention is designed to deflect elastically to absorb surplus energy when the impact member is driven to its "drop open" position. Further, unlike prior percussion tools assemblies which use conventional annular split retaining rings and separate shock absorbing structures, the present invention provides a single split retaining ring structure which functions as both a retaining ring and a shock absorber.

Further features and advantages of the present invention will become apparent from the following detailed description and the accompanying drawings.

BRIEF DESCRIPTION OF THE DRAWINGS

FIG. 1 is a cut away view of a rock drill assembly incorporating a retaining ring according to the invention;

FIG. 2 is an exploded view of the lower end of the drill assembly of FIG. 1, showing the split retaining ring of the present invention;

FIG. 3 is an enlarged, exploded view of a split retaining ring according to the invention;

FIG. 4 is a cross sectional view of the lower end of the rock drill assembly during normal drilling operations, with a split retaining ring according to the invention incorporated therein;

FIG. 5 is a cross sectional view of the lower end of the rock drill assembly when the drill bit has been driven toward a "drop open" position, and the drill bit engages the retaining ring of the present invention;

FIGS. 9–11 are longitudinal sectional views of portions of a rock drill assembly, illustrating the piston and part of the drill bit in different positions during drilling, FIGS. 9 and 10 are sectional views taken along the line A—A in FIG. 12 and FIG. 11 is a sectional view taken along the line A–B in FIG. 12; and FIG. 12 is a radial, cross sectional view of the casing portion of the rock drill assembly of FIG. 10, taken along the line 12—12.

DETAILED DESCRIPTION OF THE PREFERRED EMBODIMENT

Figure 6:
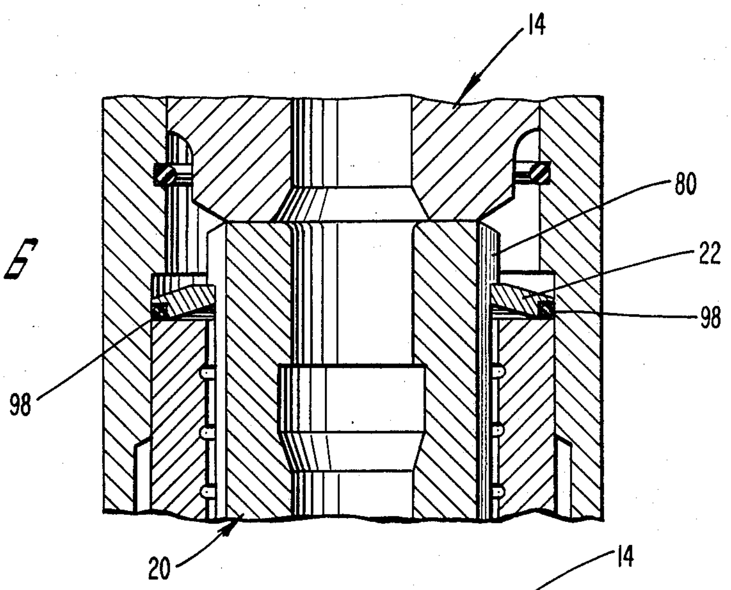
FIGS. 6–8 are fragmentary cross sectional views of a rock drill assembly, showing modified ways of incorporating a split retaining ring into the rock drill assembly, according to the present invention.

As discussed above, the present invention relates to a special retaining ring for a percussion tool assembly such as a rock drill. FIG. 3 illustrates the split retaining ring, and FIGS. 1, 2, 4 and 5 illustrates the manner in which the retaining ring is incorporated in a rock drill assembly 10.

The rock drill assembly 10 includes a cylindrical casing 12 which is rotated about a central axis 13 by conventional drive means (not shown). A piston 14 is axially moveable within the casing 12. A valve assembly 16, described more fully below, is disposed within the casing 12. The valve assembly 16 controls air from a compressor to operate the piston 14.

The bottom or forward end of the drill assembly includes a driver sub 18 and a drill bit 20. The driver sub 18 has an upper portion 21 disposed inside the casing 12 and a lower portion 24 forming an extension of the casing. The upper portion 21 of the driver sub 18 has a threaded connection with the inside of the casing 12. Thus, the driver sub 18 is fixed to the casing 12 and rotates with the casing 12.

The drill bit 20 has (i) a shank 26 disposed in a central opening 28 in the driver sub 18 and (ii) a cutting portion 27 (of conventional design) disposed outside the driver sub 18 and the casing 12. The shank 26 has external splines 30 which engage internal splines 32 on the driver sub 18. The splined connection between the drill bit and the driver sub causes the drill bit 20 to rotate with the driver sub and enables the drill bit 20 to move axially relative to the driver sub and the casing 12.

FIGS. 9–12 illustrate the portions of the valve assembly 16 which control compressed air to operate the piston 14. The valve assembly 16 includes a valve member 33 which is fixed in the casing 12. The valve member 33 defines part of an inlet chamber 34 inside the casing. Compressed air from a source (not shown) communicates with an inlet chamber 34 through a check valve 36. A spring 38 biases the check valve 36 to a closed position (see FIG. 10). The check valve 36 opens when air pressure from the source exceeds (i) the air pressure in the inlet chamber 34 and (ii) the biasing force applied to the check valve 36 by the spring 38.

The piston 14 is disposed in a fluid cavity 40 formed inside a casing member 41. Upper and lower fluid chambers 42, 43 are defined within the fluid cavity, on opposed sides of the piston 14. The piston 14 can move in the fluid cavity 40 when fluid pressures in the fluid chambers 42, 43 causes an unbalanced force to be applied to the piston 14.

A first series of vertical grooves 44 are formed in the inside wall 45 of casing member 41. The vertical grooves 44 open toward the inside of fluid cavity 40. A second series of vertical grooves 46 are also formed in the inside wall 45 of casing member 41. The second series of grooves 46 are disposed below the first series of grooves 44, and also open toward the inside of fluid cavity 40.

A series of vertical holes 50 are drilled in the outside wall 51 of casing member 41. A sleeve 52 surrounds the outside wall 51 of casing member 41, and together with the drilled vertical holes 50 defines fluid passages 54 in the casing member 41 (see FIGS. 9, 11). The upper ends of the fluid passages 54 communicate with the inlet chamber 34 through radial passages 56 formed in the casing member 41 and radial passages 57 in the fixed valve member 33 (see FIGS. 9, 11). The lower ends of the fluid passages 54 communicate with the fluid cavity 40 through radial passages 58 formed in the casing member 41 (see FIGS. 9–11). Thus, the radial passages 58 provide a source of high pressure air for operating the piston 14.

The outer wall of piston 14 has an annular central recess 60, and the ends of the piston define valve lands 62, 64. The annular central recess 60 and the valve lands 62, 64 of the piston, the grooves 44, 46 in the casing member 41, and the radial passages 58 in the casing control the fluid flow which operates the piston 14, as discussed below.

A central fluid venting path is provided in the drill assembly. Specifically, the inlet chamber 34 communicates with the fluid cavity 40 through a choke 66 and a passage 67 in the fixed valve member 33. A central vent passage 68 is formed in the piston 14, and a central vent passage 70 is formed in the drill bit 20. The central vent passage 70 in the drill bit is vented to ambient pressure through vent openings 70A, 70B (see FIG. 11). A resilient valve sleeve 72 interconnects the central vent passages 68, 70 in the piston and drill bit, respectively, in certain positions (see e.g., FIGS. 10, 11).

Figure 9:
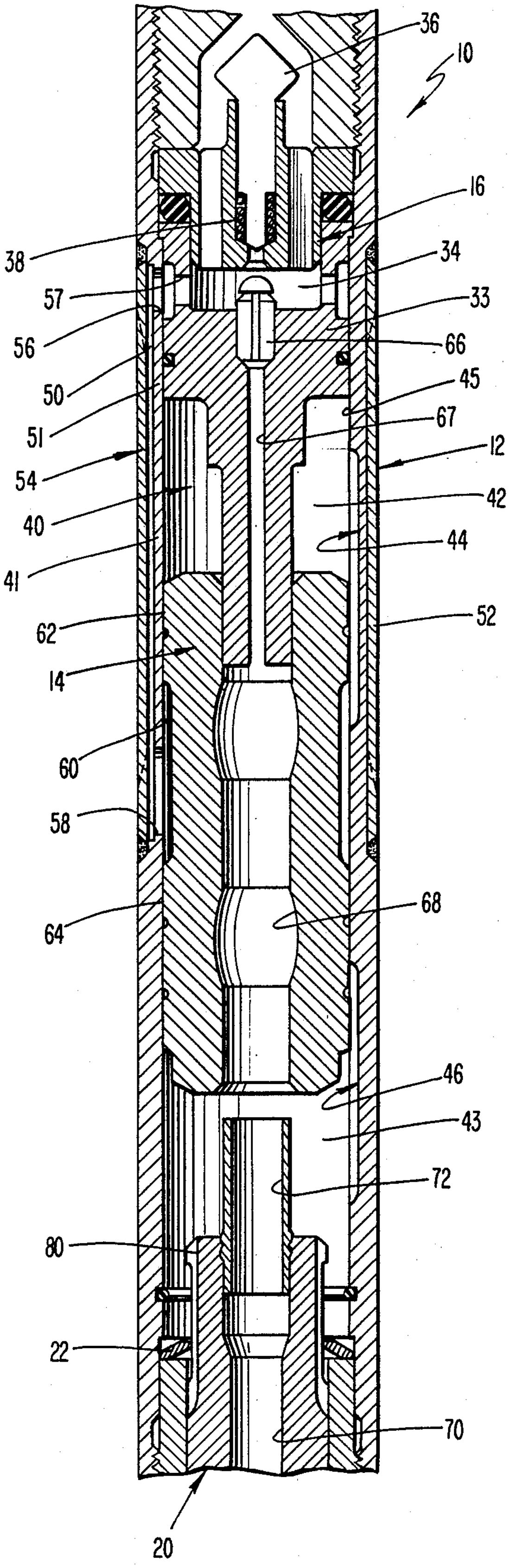

FIG. 9 illustrates the piston 14 in an upper position, spaced from the drill bit 20, just before the piston is driven downward toward the drill bit 20. The annular central recess 60 in the piston communicates high pressure air from radial passages 58 to vertical grooves 44 in the casing. The grooves 44 communicate the high pressure to the upper fluid chamber 42. The lower fluid chamber 43 is vented through the resilient valve sleeve 72 and the central vent passage 70 in the drill bit 20. Thus, there is a pressure differential across the piston 14, tending to drive the piston downward toward the drill bit 20.

Figure 10:
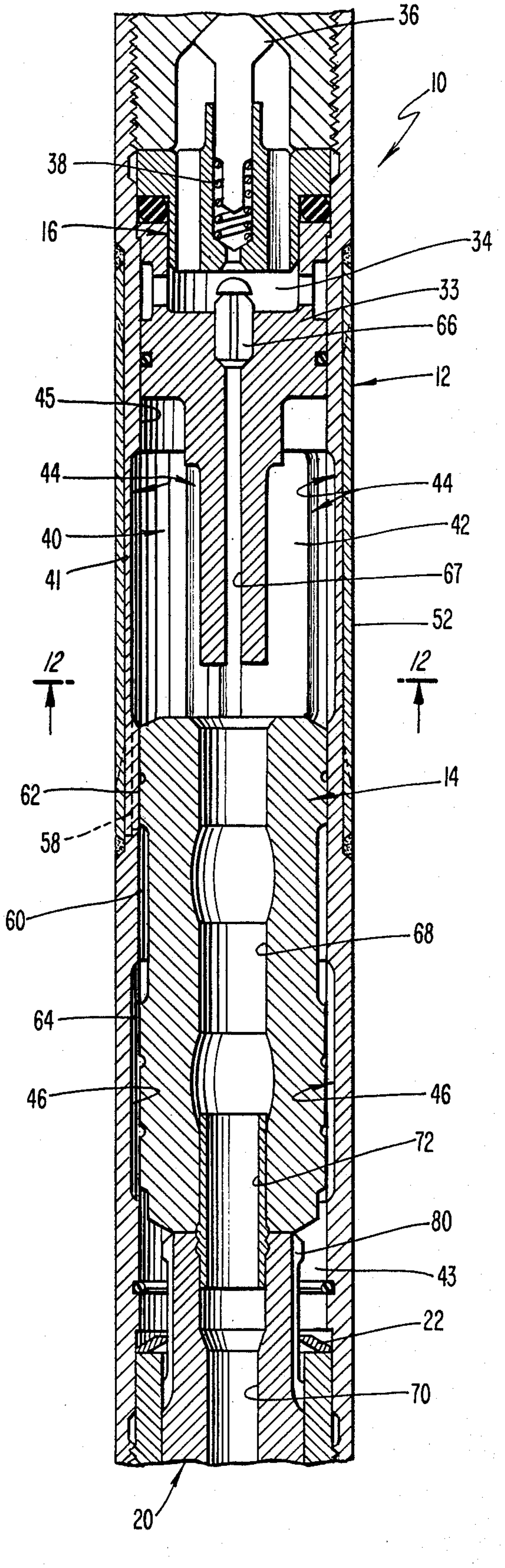

FIG. 10 illustrates the piston 14 in an intermediate position in which the annular central recess 60 in the piston and the valve lands 62, 64 on the piston closes communication between the high pressure passages 58 and the upper chamber 42, but the annular central recess 60 in the piston and the grooves 46 in the casing member 41 establish communication between the high pressure passages 58 and the lower chamber 43. The upper chamber 42 is vented through the central vent passages 68, 70 in the piston and the drill bit. During normal drilling operations, the intermediate position of FIG. 10 occurs toward the end of the downstroke of the piston (i.e., when the piston 14 is being driven against the drill bit 20) and also at the beginning of an upstroke of the piston (i.e., when the piston is being raised to the position of FIG. 9).

FIG. 11 illustrates the piston 14 in its "drop open" position. In that position, communication between high pressure passages 58 and the upper chamber 42 is closed, but high pressure does exist in the lower chamber 43. The upper chamber 42 is vented through the central vent passages 68, 70 in the piston 14 and the drill bit 20. Thus, there is a net upward fluid pressure on the piston 14.

As should be clear from the foregoing discussion, when the piston 14 is in the position of FIG. 9, high pressure fluid is directed into the upper chamber 42, and the lower chamber 43 is vented through the drill bit 20. The pressure differential across the piston 14 drives the piston downward and against the drill bit 20. As the piston 14 is being driven against the drill bit 20, the piston restricts communication of high pressure fluid with the upper chamber 42, and establishes communication of high pressure fluid with the lower fluid chamber 43. Thus, unless the drill bit 20 is driven to its "drop open" position, when the drill bit 20 encounters resistance from the rock or other strata being drilled, the movement of the piston will be slowed by the fluid pressure differential and the energy absorbed during drilling. The fluid pressure differential across the piston will be in an upward direction (see FIG. 10) and will cause the piston to return to the position of FIG. 9. If the piston drives the drill bit 20 to its "drop open" position (FIG. 11), the retaining ring 22 resiliently resists the drill bit from being driven out of the drill assembly, in a manner described hereinafter. The lower chamber 43 is cut off from communication with the high pressure passages 58, but the high pressure existing in the lower fluid chamber 43 and the venting of the upper chamber through the drill bit will cause the piston to begin to move upward toward the position of FIG. 9.

On each downstroke of the piston 14, the piston impacts the drill bit 20. When the piston 14 impacts the drill bit 20, the drill bit 20 is driven downward into the rock (or other strata) being drilled. Under normal drilling conditions, the rock absorbs most of the energy of drilling, and the drill bit 20 is driven downward only a short distance into the rock. However, under certain circumstances, e.g., if the rock is weak or unconsolidated, or if poor drilling practices are used, the drill bit 20 can be driven to its "drop open" position. In such an event, the special retaining ring 22, described more fully below, prevents the drill bit 20 from being driven out of the casing, and also acts as a shock absorber to absorb surplus energy that would otherwise be transmitted to the drill bit 20 or to the threaded connection between the driver sub and the casing 12.

The upper end of the drill bit 20 has a retaining shoulder structure 80. As illustrated in FIG. 2, the retaining structure 80 is formed by several arcuate segments 82. However, the retaining shoulder structure could also comprise a continuous annular ring, as will be readily appreciated by those of ordinary skill in the art. The retaining ring 22 is located inside the casing 12 and is disposed to engage the retaining shoulder structure 80 of the drill bit 20 when the drill bit is driven to its "drop open" position.

Referring to FIGS. 2–5, the retaining ring 22 comprises a pair of segments 84, 86 which combine to form a split ring with a Belleville spring-like profile. In this application, reference to a "Belleville spring" refers to an annular ring or washer which (i) has a frusto-conical (or dished) shape, (ii) is made of spring steel or other elastically deflectable material, and (iii) is designed to deflect elastically when loaded and to recover its form when unloaded. Reference to the split retaining ring of the invention having a "Belleville spring-like profile" means a split ring whose sections (i) combine to form a frusto-conical (or dished) shape which looks like a Belleville spring, (ii) are made of spring steel or other elastically deflectable material, and (iii) deflect elastically when loaded and recover their form when unloaded.

The split retaining ring 22 is located at the upper end of the driver sub 18 forwardly of the shoulder 80 (see FIGS. 1, 4 and 5). The radially outer portion 88 of the split retaining ring is located adjacent the inside of the casing 12 and rests on the top of the driver sub 18. The segments 84, 86 of the retaining ring 22 surround and converge toward the central axis 13 of the drill assembly. The radially inner portion 90 of the split retaining ring 22 is disposed to engage the retaining shoulder structure 80 of the drill bit 20 when the drill bit has been driven to its "drop open" position (see FIG.5). Thus, if the drill bit is driven to the "drop open" position of FIG. 5, the retaining shoulder 80 on the drill bit engages the radially inner portion 90 of the retaining ring 22.

The radius of the radial outer portion 88 of the retaining ring 22 and the radius of the inside wall of the casing 12 provides some slight clearance between those members. Moreover, the radius of the radial inner portion 90 of the retaining ring 22 and the drill bit shank 26 provides some slight clearance between those members. Under normal drilling conditions, those clearances allow the retaining ring 22 to "float" in the casing 12, to minimize wear on the parts and to minimize the likelihood of the retaining ring 22 interfering with the drill bit during normal drilling conditions.

As seen in FIGS. 4 and 5, the radially outer portion 88 of the retaining ring has a substantially flat annular surface 94 which rests on the top annular surface 89 of the driver sub 18. Also, the radially inner portion 90 of the retaining ring has a substantially flat annular surface 96 which contacts the retaining shoulder 80 of the drill bit 20 when the drill bit is driven into engagement with the retaining ring 22. The substantially flat annular surfaces 94, 96 of the retaining ring help the retaining ring establish good force transmitting contact with the retaining shoulder structure 80 and the driver sub 18 when the drill bit 20 is driven into engagement with the retaining ring 22.

The drill bit 20 can be driven to the "drop open" position (FIG. 5) for different reasons. It can be driven to the "drop open" position because of poor drilling practices, or because the rock being drilled is too weak or is not consolidated. When the drill bit 20 is driven to the "drop open" position of FIG. 5, the retaining shoulder 80 of the drill bit engages the radially inner portion 90 of the retaining ring 22. Reaction forces are applied primarily between the drill bit 20, the retaining ring 22 and the driver sub 18. The retaining ring 22 deflects elastically to absorb surplus energy while retaining the drill bit 20 in the drill assembly. When the surplus energy has been absorbed, the drill bit can return to a "normal" drilling position (e.g., the position of FIG. 4). The elasticity of the retaining ring 22 enables the retaining ring to return to its original state (FIG. 4).

Figure 7:
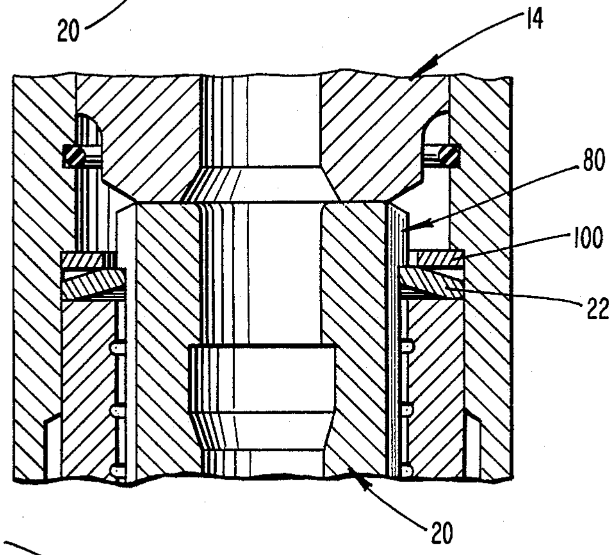
Figure 8:
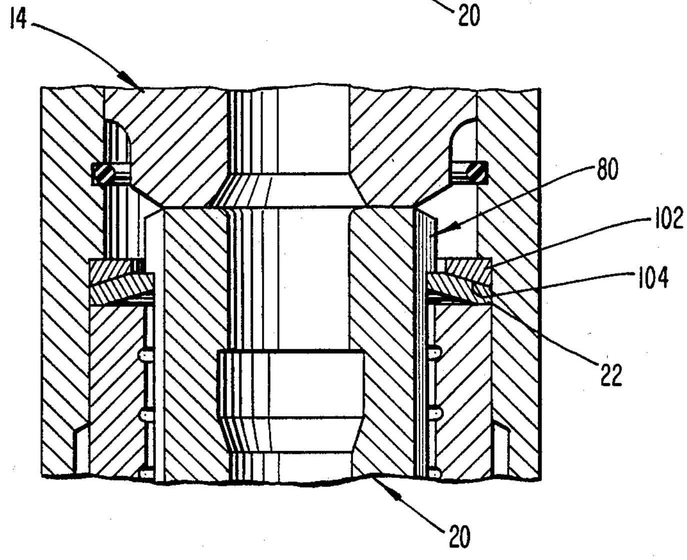

In the embodiment of FIGS. 1–5, the retaining ring 22 is mounted in the drill assembly without any additional alignment (containment) or biasing structure for the split retaining ring. FIGS. 6–8 show modified ways for aligning and/or biasing the split retaining ring in a drill assembly. Specifically, FIG. 6 shows a split retaining ring 22, similar to that of FIGS. 4 and 5, with an elastomeric ring 98 disposed between the casing 12 and the radially outer portion 88 of the split retaining ring. The elastomeric ring 98 is useful in assembling the split retaining ring 22 and aligning the split retaining ring 22 in the drill assembly. Also, the elastomeric ring 98 helps maintain the retaining ring away from the casing, thereby minimizing wear on the casing 12. FIG. 7 shows a split retaining ring 22, similar to that of FIGS. 4 and 5, with a top containment plate 100 comprising a flat annular plate. FIG. 8 is similar to FIG. 7, but shows a top containment plate 102 with a conically shaped surface 104 facing the retaining ring 22. The retaining plates of FIGS. 7, 8 are designed to maintain the split retaining ring 22 in a proper orientation for engaging the annular shoulder structure 80 on the drill bit 20.

Thus, the present invention provides a new split retaining ring structure which is particularly useful in percussion drills such as rock drills. Moreover, it is believed the principles of this invention may be useful in forming retaining rings for use with other types of percussion tools.

The invention has been described above in an illustrative manner, and it is to be understood that the terminology which has been used is intended to be in the nature of words of description rather than of limitation. Obviously, many modifications and variations of the present invention are possible in light of the above teachings. It is, therefore, to be understood that the invention may be practiced otherwise than as specifically described and the scope of the invention is defined by the appended claims.

What is claimed is:

1. A percussion tool assembly comprising a casing, an impact member disposed partly inside the casing and partly outside a forward end of the casing, a portion of said impact member disposed inside the casing including a retaining shoulder, a piston disposed within the casing, said piston being adapted to drive the impact member forwardly relative to the casing and against an external object, and a retaining ring for engaging the impact member after a predetermined amount of forward movement of the impact member relative to the casing for retaining the impact member in the casing; said retaining ring comprising a split ring situated forwardly of said retaining shoulder and adapted to deflect resiliently to absorb energy when the impact member is driven forwardly by the piston such that said retaining shoulder is brought into engagement with the split ring.

2. A percussion tool assembly as defined in claim 1 wherein said split retaining ring has a Belleville spring-like profile.

3. A percussion tool assembly as defined in claim 2 wherein said piston is adapted for reciprocating movement along an axis, said split retaining ring comprising a pair of ring sections which surround and converge toward said axis, said split retaining ring defining an annular radially inner portion for engaging a portion of the impact member when the impact member moves said predetermined distance relative to the casing.

4. A percussion tool assembly as defined in claim 3 wherein said split ring has an annular radially outer portion, and an annular elastomeric ring is disposed between said annular radially outer portion of the split ring and the inside wall of said casing.

5. A percussion tool assembly as defined in claim 3, further including a retaining plate disposed adjacent said split retaining ring, said retaining plate adapted to retain said split retaining ring in a predetermined orientation in said casing.

6. A percussion tool assembly as defined in claim 5 wherein said retaining plate comprises a flat annular ring.

7. A percussion tool assembly as defined in claim 5 wherein said retaining plate has a frusto-conical surface facing a frusto-conical surface of said Belleville spring-like split retaining ring.

8. A percussion tool assembly as defined in claim 1 wherein said impact member comprises a rock drill bit.

9. A percussion tool assembly as defined in claim 8 wherein said casing is substantially cylindrical and is rotatable about an axis, said percussion tool assembly comprising a driver sub disposed at least partially within the cylindrical casing, the driver sub and the cylindrical casing having mating threads which fixedly couple the driver sub to the casing, said rock drill bit including a shank disposed in an opening in said driver sub, said driver sub and said rock drill bit having splined connections which couple said driver sub and said rock drill bit for joint rotation and which allow some axial movement of said rock drill bit relative to said driver sub.

10. A percussion tool as defined in claim 9 wherein said radially outer portion of said retaining ring includes a substantially flat annular surface resting on a portion of said driver sub and said radially inner portion of said retaining ring comprises a relatively flat annular surface for engaging the retaining shoulder of said rock drill bit shank when said rock drill bit shank has moved said predetermined amount relative to said casing.

11. A percussion tool assembly comprising a casing, a rock drill bit disposed partly inside the casing and partly outside the casing, a piston disposed within the casing, said piston being adapted to drive the rock drill bit forwardly relative to the casing and against an external object, and a retaining ring for engaging the rock drill bit relative to the casing for retaining the rock drill bit in the casing; said retaining ring comprising a split ring adapted to deflect resiliently to absorb energy when the rock drill bit is driven forwardly by the piston into engagement with the split ring, said casing being substantially cylindrical and rotatable about a longitudinal axis of said casing, means operably interconnecting said casing and said rock drill bit for common rotation while allowing some axial movement of said rock drill bit relative to said casing, said split retaining ring seated on an annular surface extending about said axis within said casing, said rock drill bit having a retaining shoulder disposed within said casing for engaging said split retaining ring when said rock drill bit shank has moved said predetermined amount relative to said casing.

12. A percussion tool assembly comprising a casing, an impact member disposed partly inside the casing and partly outside the casing, a piston disposed within the casing, said piston being adapted to drive the impact member relative to the casing and against an external object, and a retaining ring for engaging the impact member after a predetermined amount of movement of the impact member relative to the casing for retaining the impact member in the casing; said retaining ring comprising a split ring adapted to deflect resiliently to absorb energy when the impact member is driven by the piston into engagement with the split ring, said impact member comprising a rock drill bit, said casing being substantially cylindrical and rotatable about a longitudinal axis, said percussion tool assembly comprising a driver sub disposed at least partially within the cylindrical casing, the driver sub and the cylindrical casing having mating threads which fixedly couple the driver sub to the casing, said rock drill bit including a shank disposed in an opening in said driver sub, said driver sub and said rock drill bit having splined connections which couple said driver sub and said rock drill bit for joint rotation and which allow some axial movement of said rock drill bit relative to said driver sub, and said rock drill bit shank having a retaining shoulder for engaging said split retaining ring when said rock drill bit shank has moved said predetermined amount relative to said casing.

* * * * *